(12) United States Patent
Liu et al.

(10) Patent No.: US 11,528,844 B2
(45) Date of Patent: Dec. 20, 2022

(54) AUTOMATIC HARVESTING AND COLLECTING DEVICE FOR SISAL HEMP LEAVES

(71) Applicant: JIANGXI UNIVERSITY OF SCIENCE AND TECHNOLOGY, Jiangxi (CN)

(72) Inventors: Qingkang Liu, Jiangxi (CN); Xiaohong Zhu, Jiangxi (CN); Sheng Gao, Jiangxi (CN); Yao Zhang, Jiangxi (CN); Min Chen, Jiangxi (CN); Cijun Shuai, Jiangxi (CN)

(73) Assignee: JIANGXI UNIVERSITY OF SCIENCE AND TECHNOLOGY, Ganzhou (CN)

( * ) Notice: Subject to any disclaimer, the term of this patent is extended or adjusted under 35 U.S.C. 154(b) by 158 days.

(21) Appl. No.: 17/100,843

(22) Filed: Nov. 21, 2020

(65) Prior Publication Data
US 2021/0153437 A1    May 27, 2021

(30) Foreign Application Priority Data

Nov. 21, 2019 (CN) .......................... 201911146584.2

(51) Int. Cl.
*A01D 46/30* (2006.01)
*A01D 46/22* (2006.01)
*A01D 45/06* (2006.01)

(52) U.S. Cl.
CPC ........... *A01D 46/30* (2013.01); *A01D 45/065* (2013.01); *A01D 46/22* (2013.01)

(58) Field of Classification Search
CPC ...... A01D 46/30; A01D 45/065; A01D 46/22; A01D 46/24; A01D 46/243; A01D 46/247; A01D 45/002
See application file for complete search history.

(56) References Cited

U.S. PATENT DOCUMENTS

| 4,532,757 A * | 8/1985 | Tutle ..................... A01D 46/24 |
| | | 382/110 |
| 4,718,223 A * | 1/1988 | Suzuki ................ A01D 46/005 |
| | | 56/332 |
| 4,975,016 A * | 12/1990 | Pellenc .................. B25J 19/023 |
| | | 414/730 |
| 5,544,474 A * | 8/1996 | Finkelstein ............ A01D 46/30 |
| | | 56/10.2 A |
| 10,327,399 B2 * | 6/2019 | Elazary ................ G05D 1/0246 |
| 2018/0146618 A1 * | 5/2018 | Elazary ................. A01D 46/30 |

FOREIGN PATENT DOCUMENTS

| CN | 106576589 A | * | 4/2017 | |
| CN | 107836208 A | * | 3/2018 | ............. A01D 46/30 |
| CN | 207099722 U | | 3/2018 | |

(Continued)

*Primary Examiner* — Adam J Behrens
*Assistant Examiner* — Madeline I Runco (57) ABSTRACT

An automatic harvesting and collecting device for sisal hemp leaves includes an up-and-down moving assembly, a steering device, a braking mechanism, a mechanical vision sensor device, a vehicle traveling and controlling device, a forward-and-backward moving assembly, an omnidirectional automatic positioning and rotating device, a shearing and clamping device, a collecting device and a frame.

9 Claims, 5 Drawing Sheets

(56) References Cited

FOREIGN PATENT DOCUMENTS

| | | | | |
|---|---|---|---|---|
| CN | 207317739 U | | 5/2018 | |
| CN | 207427851 U | | 6/2018 | |
| CN | 108834548 A | * | 11/2018 | ........... A01D 45/002 |
| CN | 108934448 A | | 12/2018 | |
| CN | 109220225 A | | 1/2019 | |
| JP | H05168332 A | * | 7/1993 | |
| JP | 2020174546 A | * | 10/2020 | |
| KR | 100667220 B1 | * | 1/2007 | |
| KR | 101249355 B1 | * | 4/2013 | |
| KR | 101458534 B1 | * | 11/2014 | |

* cited by examiner

AUTOMATIC HARVESTING AND COLLECTING DEVICE FOR SISAL HEMP LEAVES

CROSS-REFERENCE TO RELATED APPLICATIONS

This application claims the benefit of priority from Chinese Patent Application No. 201911146584.2, filed on Nov. 21, 2019. The content of the aforementioned applications, including any intervening amendments thereto, is incorporated herein by reference in its entirety.

TECHNICAL FIELD

The present invention relates to the technical field of crop harvesting machinery, in particular to an automatic harvesting and collecting device for sisal hemp leaves.

BACKGROUND OF THE PRESENT INVENTION

Sisal hemp leaf fibers are tough, wear-resistant, salt and alkali-resistant, corrosion-resistant. They are widely applied to the transportation, fishery, petroleum, metallurgy and other industries. The sisal hemp leaf is an irreplaceable tropical crop, second only to the natural rubber and palm oil. Sisal hemp fibers play an irreplaceable role in the manufacturing of steel wire rope inner cores for high-grade elevators and stainless-steel polishing cloth, so that the sisal hemp has great market potential. In China, the sisal hemp production areas are mainly concentrated in large-scale farms in Guangdong, Guangxi and Hainan provinces. The sisal hemp planting and leaf production have basically achieved mechanized operations from soil preparation, seedling planting and field management to leaf transportation, fiber scraping, hemp field renovation and other production links. However, no mature model of sisal hemp leaf cutting and harvesting machinery is available in the market at present. The harvesting process accounts for more than half of the labor in the whole production process. In addition, a great number of people are needed in the harvesting process. Therefore, it is necessary to invent the sisal hemp leaf harvesting machinery to solve the problem of cutting and harvesting the sisal hemp leaves.

SUMMARY OF THE PRESENT INVENTION

The present invention provides an automatic harvesting and collecting device for sisal hemp leaves. The beneficial effect of the present invention is that the cutting and the collecting of the sisal hemp leaves can be integrated automatically or manually.

The present invention relates to the technical field of crop harvesting machinery, in particular to an automatic harvesting and collecting device for sisal hemp leaves, which includes a forward-and-backward moving assembly, an up-and-down moving assembly, a steering device, a shearing and clamping device, a braking mechanism, a mechanical vision sensor device, a vehicle traveling and controlling device, an omnidirectional automatic positioning and rotating device, a shearing and clamping control rod, a collecting device, a master control box, a storage battery and a frame. The present invention can integrate the cutting and the collecting of the sisal hemp leaves automatically or manually.

The forward-and-backward moving assembly, the up-and-down moving assembly, the steering device, the shearing and clamping device, the braking mechanism, the mechanical vision sensor device, the vehicle traveling and controlling device, the omnidirectional automatic positioning and rotating device, the shearing and clamping device, the shearing and clamping control rod, the collecting device, the master control box and the storage battery are all mounted on the frame.

The omnidirectional automatic positioning and rotating device is mounted on the up-and-down moving assembly; and the up-and-down moving assembly is configured to control the up-and-down movement of the omnidirectional automatic positioning and rotating device. The forward-and-backward moving assembly is mounted on the omnidirectional automatic positioning and rotating device; and the shearing and clamping device is mounted on the forward-and-backward moving assembly used for driving the shearing and clamping device to move forward and backward. The omnidirectional automatic positioning and rotating device is used for driving the omnidirectional rotation of the forward-and-backward moving assembly, so as to drive the omnidirectional rotation of the shearing and clamping device; and the shearing and clamping device is configured to clamp and shear the sisal hemp leaves. The vehicle traveling and controlling device is configured to control the frame to move forward and backward. The steering device is configured to control the steering of the frame; and the braking mechanism is arranged on the steering device and is configured to brake the frame. The mechanical vision sensor device is mounted on the forward-and-backward moving assembly; the image processing system is mounted in the master control box; and the mechanical vision sensor device is configured to acquire image signals of positions of the sisal hemp leaves and transmit the signals to the image processing system, thereby obtaining the position information of the sisal hemp leaves. According to the position information of the sisal hemp leaves obtained by the image processing system, the master control box can control the forward-and-backward moving assembly, the up-and-down moving assembly and the omnidirectional automatic positioning and rotating device to adjust the orientation and angle of the shearing and clamping device, then control the shearing and clamping device to harvest and collect the sisal hemp leaves automatically.

The shearing and clamping control rod is mounted at one end of the forward-and-backward moving assembly far away from the shearing and clamping device, and is configured to manually control and adjust the forward-and-backward moving assembly, the up-and-down moving assembly and the omnidirectional automatic positioning and rotating device, thereby controlling the shearing and clamping device to manually harvest and collect the sisal hemp leaves.

The storage battery is connected with the master control box, and is configured to provide energy for the forward-and-backward moving assembly, the up-and-down moving assembly, the mechanical vision sensor device, the vehicle traveling and controlling device, the omnidirectional automatic positioning and rotating device, the shearing and clamping device and the master control box; and the collecting device is configured to collect and bundle the sisal hemp leaves.

The up-and-down moving assembly includes a height adjusting hydraulic cylinder, an oil tank, a hydraulic pipeline and an electric hydraulic pump, which are all mounted on the frame. The storage battery is connected with the electric hydraulic pump and provides energy for the electric hydraulic pump. The height adjusting hydraulic cylinder includes a push rod and a cylinder block, wherein one end of the push rod extends into the cylinder block; and the other end of the push rod is connected with the omnidirectional automatic positioning and rotating device. The cylinder block is configured to store the hydraulic oil needed for operation; the push rod can move up and down relative to the cylinder block; and the oil tank is configured to supply the hydraulic oil needed for operation to the electric hydraulic pump and cylinder block through the hydraulic pipeline. The electric hydraulic pump is configured to control the flow direction and the flow rate of hydraulic oil in the hydraulic pipeline, so as to control the moving direction and speed of the push rod of the height adjusting hydraulic cylinder, thereby controlling the omnidirectional automatic positioning and rotating device to move up and down. The electric hydraulic pump is provided with a first oil outlet and a second oil outlet; the height adjusting hydraulic cylinder is provided with a third oil outlet and a fourth oil outlet; and the oil tank is provided with a fifth oil outlet and a sixth oil outlet. The first oil outlet of the electric hydraulic pump is communicated with the third oil outlet of the height adjusting hydraulic cylinder through the hydraulic pipeline; the fourth oil outlet of the height adjusting hydraulic cylinder is communicated with the fifth oil outlet of the oil tank through the hydraulic pipeline; and the sixth oil outlet of the oil tank is communicated with the second oil outlet of the electric hydraulic pump through the hydraulic pipeline. Under the control of the electric hydraulic pump, the hydraulic oil in the oil tank flows out from the sixth oil outlet, flows into the electric hydraulic pump from the second oil outlet through the hydraulic pipeline, then flows out from the first oil outlet, flows into the cylinder block of the height adjusting hydraulic cylinder from the third oil outlet through the hydraulic pipeline, then flows out from the fourth oil outlet, and flows into the oil tank from the fifth oil outlet through the hydraulic pipeline, so as to form a hydraulic system loop.

The steering device includes wheels, a direction steering control rod, a steering shaft, a straightening rod, a steering tie rod and a steering knuckle, which are all mounted on the frame. The direction steering control rod is in transmission connection with the steering rod. The steering rod is nested in the steering shaft and is in transmission connection with the steering shaft. The steering shaft is nested in the straightening rod and is in transmission connection with the straightening rod. The straightening rod is in transmission connection with the steering tie rod; the steering tie rod is in transmission connection with the steering knuckle; and the steering knuckle is in transmission connection with the wheels. The direction steering control rod is rotated to drive the steering rod to rotate, thereby driving the steering shaft to rotate. The rotation of the steering shaft drives the straightening rod to rotate to drive the steering tie rod to move, thereby driving the wheels to steer through the steering knuckle and realizing the steering of the frame. In addition, the steering rod can move up and down along the own axis, thereby driving the direction steering control rod to move up and down.

The shearing and clamping device includes an upper clamping piece, a lower clamping piece, an upper blade, a lower blade, two pulling rope pin shafts, a turntable gear box, a first stepping motor, two fixing bolts, a rope winding double-motor box, a first spindle motor, a first gear, loose rotating rods, encircling small rings, two pulling ropes, two clamping blade fixing heads and two springs.

The two fixing bolts respectively refer to a first fixing bolt and a second fixing bolt; and the two clamping blade fixing heads refer to a first clamping blade fixing head and a second clamping blade fixing head, respectively.

The first fixing bolt sequentially penetrates through the first clamping blade fixing head, the upper clamping piece and the lower clamping piece; the upper clamping piece is in clearance fit with the first fixing bolt; both the lower clamping piece and the first clamping blade fixing head are in interference fit with the first fixing bolt, so that the upper clamping piece can rotate about the first fixing bolt.

The second fixing bolt sequentially penetrates through the second clamping blade fixing head, the upper blade and the lower blade; the upper blade is in clearance fit with the second fixing bolt; both the lower blade and the second clamping blade fixing head are in interference fit with the second fixing bolt, so that the upper blade can rotate about the second fixing bolt.

The two springs respectively refer to a first spring and a second spring, wherein the first spring is arranged between the upper clamping piece and the lower clamping piece, and provides opposite elastic forces for the upper clamping piece and the lower clamping piece respectively, so that the upper clamping piece and the lower clamping piece are in a closed state. The second spring is arranged between the upper blade and the lower blade, and provides opposite elastic forces for the upper blade and the lower blade respectively, so that the upper blade and the lower blade are in a closed state.

The first clamping blade fixing head and the second clamping blade fixing head are connected with two first gears mounted in a turntable gearbox, respectively; another first gear is mounted between the two first gears; and the first gears on both sides are meshed with the middle first gear, respectively. The turntable gearbox is connected with one end of the first spindle motor; and the other end of the first spindle motor is connected with the rope winding double-motor box. The first spindle motor drives the three first gears in the turntable gearbox to rotate, so as to drive the first clamping blade fixing head and the second clamping blade fixing head to rotate respectively, thereby changing the relative positions of the upper clamping piece and the lower clamping piece, the upper blade and the lower blade, so that the upper clamping piece and the lower clamping piece, the upper blade and the lower blade can clamp and shear the sisal hemp leaves in different directions.

The first stepping motor is arranged in the rope winding double-motor box; and the rope winding double-motor box is mounted on the forward-and-backward moving assembly.

The two pulling ropes refer to a first pulling rope and a second pulling rope respectively; and the pulling rope pin shafts refer to a first pulling rope pin shaft and a second pulling rope pin shaft, respectively. The upper blade is connected with one end of the second pulling rope; and the other end of the second pulling rope bypasses the second pulling rope pin shaft and extends outwards to be connected with the first stepping motor. The upper clamping piece is connected with one end of the first pulling rope; and the other end of the first pulling rope bypasses the first pulling rope pin shaft, and extends outwards to be connected with the first stepping motor. Both the first pulling rope and the second pulling rope are positioned through the turntable gearbox; and the first stepping motor can control the upper clamping piece and the upper blade to clamp and shear the sisal hemp leaves through the first pulling rope and the second pulling rope, respectively.

The rope winding double-motor box is connected with the turntable gearbox through the loose rotating rod; and the winding small ring for preventing the rotation of the pulling rope is wound around the pulling rope.

The braking mechanism includes a brake lever, a steel wire and a brake pad. The brake pad is used for compressing the wheel; the brake lever is connected with the one end of steel wire; and one end of the steel wire far away from the brake lever is connected with the brake pad. The steel wire is stretched by gripping the brake lever, to pull the brake pad, so that the brake pad compresses the wheel to stop the rotation of the wheel.

The mechanical vision sensor device includes a mechanical vision sensor, an illuminating lamp and a base bracket; the base bracket is mounted on the forward-and-backward moving assembly; the mechanical vision sensor and the illuminating lamp are arranged on the base bracket; and the mechanical vision sensor is connected with the image processing system mounted in the master control box. The mechanical vision sensor is configured to acquire image signals of positions of the sisal hemp leaves and transmit the image signals to the image processing system, thereby obtaining the position information of the sisal hemp leaves. According to the position information of the sisal hemp leaves obtained by the image processing system, the master control box can control the forward-and-backward moving assembly, the up-and-down moving assembly and the omnidirectional automatic positioning rotating device to adjust the orientation and angle of the shearing and clamping device, then the sisal hemp leaves are harvested and collected automatically.

The vehicle traveling and controlling device includes a hub motor, which is mounted on the frame and connected with the direction steering control rod and can drive the frame to move forward and backward. The direction steering control rod is provided with a button for controlling the rotating direction of the hub motor, wherein the button is connected with the hub motor and adjusted to control the rotating direction of the hub motor, so as to control the frame to move forward and backward. The storage battery is connected with the hub motor and is configured to provide energy for the hub motor.

The forward-and-backward moving assembly includes a telescopic rod shell, an anti-rotation piece, a telescopic rod upper cover, a fixed rod, a second gear, a third stepping motor, a lead screw and a gear nut, wherein the telescopic rod shell is mounted on the omnidirectional automatic positioning and rotating device. The lead screw is penetrated in the telescopic rod shell; the gear nut is sleeved on the lead screw; and the gear nut is in threaded fit with the lead screw. The third stepping motor is arranged on the telescopic rod shell and connected with the second gear. The second gear is meshed with the gear nut sleeved on the lead screw. The fixed rod is arranged in the telescopic rod shell, and abuts against the gear nut to prevent the gear nut from following the lead screw to move along an axial direction of the lead screw during rotation of the gear nut. The anti-rotation piece is fixedly connected with the lead screw, is connected with the fixed rod in a clamping manner, and is configured to limit the rotation of the lead screw, so that the lead screw have to move along the axial direction of the lead screw. The telescopic rod upper cover is arranged at the front end of the telescopic rod shell, and is configured to seal the telescopic rod shell. The second gear rotates under the rotation of the third stepping motor, to drive the gear nut to rotate, so that the lead screw moves forward and backward along the axial direction of the lead screw, thereby driving the shearing and clamping device to move forward and backward.

The omnidirectional automatic positioning and rotating device includes the master control box, a second stepping motor, a rotatable chassis, a support rod, two cylindrical brackets, an L-shaped bracket, a fixed disc, a second spindle motor and a fourth stepping motor. The fixed disc is fixed on the height adjusting hydraulic cylinder by the support rod. The rotatable chassis is in clearance fit with the second spindle motor, and can be driven to perform omnidirectional rotation by the spindle motor.

The two cylindrical brackets refer to a first cylindrical bracket and a second cylindrical bracket, respectively. The first cylindrical bracket is fixedly mounted on the fixed disc; and an upper end of the first cylindrical bracket is in clearance fit with the second stepping motor. The L-shaped bracket is arranged on the second stepping motor, and is fixedly connected with the second cylindrical bracket in a vertical direction. The fourth stepping motor is mounted on the second cylindrical bracket and is connected with the forward-and-backward moving assembly. The second spindle motor is configured to drive the rotatable chassis to rotate, thereby driving the first cylindrical bracket to rotate. The second stepping motor is configured to drive the L-shaped bracket to rotate, thereby driving the second cylindrical bracket to rotate. The fourth stepping motor is configured to drive the forward-and-backward moving assembly to rotate, so as to adjust the orientation and angle of the shearing and clamping device. A dust boot is sleeved outside the fixed disc.

The collecting device includes a collecting box and a bundling belt, wherein the collecting box is mounted on the frame and is configured to collect the sisal hemp leaves. The bundling belt is mounted in the collecting box and is configured to bundle the sisal hemp leaves collected by the collecting box. The frame includes a chassis, a support platform, an upper hood and a rear seat, wherein the chassis is connected with the wheels. The support platform is mounted on the chassis and is configured to accommodate the forward-and-backward moving assembly, the up-and-down moving assembly, the steering device, the shearing and clamping device, the braking mechanism, the mechanical vision sensor device, the vehicle traveling and controlling device, the omnidirectional automatic positioning and rotating device, the shearing and clamping device and the collecting device. The upper hood is arranged on the support platform; and the up-and-down moving assembly is penetrated in the upper hood to control the omnidirectional automatic positioning and rotating device to move up and down. The rear seat is arranged on the support platform.

The automatic harvesting and collecting device for sisal hemp leaves provided by the present invention has the beneficial effects as follows.

1. The automatic harvesting and collecting device for sisal hemp leaves provided by the present invention is easy to control and can integrate the automatic and manual harvesting and collecting of the sisal hemp leaves.

2. A device similar to a mechanical arm is adopted, so that the shearing and clamping device can perform horizontal positioning rotation, front-rear positioning rotation and left-right positioning rotation; thereby achieving omnidirectional positioning rotation.

3. The vehicle traveling and controlling device is configured to control of forward-and-backward movement of the automatic harvesting and collecting device for sisal hemp leaves.

4. The up-and-down moving assembly is configured to control the shearing and clamping device to move up and down more easily.

5. The forward-and-backward moving assembly is configured to control the forward-and-backward movement of the shearing and clamping device.

6. The positions of the sisal hemp leaves are determined by the mechanical vision sensor device, and the shearing and clamping device is moved to the sisal hemp leaves by the omnidirectional automatic positioning and rotating device, so that the shearing and clamping device can automatically clamp and shear the sisal hemp leaves.

BRIEF DESCRIPTION OF THE DRAWINGS

The present invention will be further described in detail with reference to the accompany drawings and specific implementation methods.

DESCRIPTION OF REFERENCE NUMERALS

In the figures: forward-and-backward moving assembly 1-1, mechanical vision sensor device 1-2, shearing and clamping device 1-3, upper hood 1-4, bundling belt 1-5, wheel 1-6, shearing and clamping control rod 1-7, direction steering control rod 1-8, rear seat 1-9, dust boot 1-10, footbrake device 1-11, chassis 1-12, hub motor 2-1, master control box 2-2, image processing system 2-21, steel rope 2-3, storage battery 2-4, upper clamping piece 3-1, lower clamping piece 3-2, upper blade 3-3, lower blade 3-4, pulling rope pin shaft 3-5, first pulling rope pin shaft 3-51, second pulling rope pin shaft 3-52, turntable gearbox 3-6, first stepping motor 3-7, fixing bolt 3-8, first fixing bolt 3-81, second fixing bolt 3-82, rope winding double-motor box 3-9, first spindle motor 3-10, first gear 3-11, loose rotating rod 3-12, encircling small ring 3-13, pulling rope 3-14, first pulling rope 3-141, second pulling rope 3-142, clamping blade fixing head 3-15, first clamping blade fixing head 3-151, second clamping blade fixing head 3-152, spring 3-16, first spring 3-161, second spring 3-162, second stepping motor 4-1, rotatable chassis 4-2, support rod 4-3, cylindrical bracket 4-4, first cylindrical bracket 4-41, second cylindrical bracket 4-42, L-shaped bracket 4-5, fixed disc 4-6, second spindle motor 4-7, fourth stepping motor 4-8, mechanical vision sensor 5-1, illuminating lamp 5-2, base bracket 5-3, height adjusting hydraulic cylinder 6-1, push rod 6-11, cylinder block 6-12, oil tank 6-2, guiding device 6-3, electric hydraulic pump 6-4, telescopic rod shell 7-1, anti-rotation piece 7-2, telescopic rod upper cover 7-3, second gear 7-5, third stepping motor 7-6, lead screw 7-7, gear nut 7-8, up-and-down moving assembly 8-1, steering device 9-1, steering rod 9-2, steering shaft 9-3, straightening rod 9-4, steering tie rod 9-5, steering knuckle 9-6, braking mechanism 10-1, brake lever 10-2, steel wire 10-3, brake pad 10-4, vehicle traveling and controlling device 11-1, omnidirectional automatic positioning and rotating device 13-1, collecting device 14-1, collecting box 14-2, frame 15-1, support platform 15-2, first oil outlet 16-1, second oil outlet 16-2, third oil outlet 16-3, fourth oil outlet 16-4, fifth oil outlet 16-5, sixth oil outlet 16-6 and button 17-1.

DETAILED DESCRIPTION OF THE PRESENT INVENTION

It should be understood in the description of the present invention that terms, such as "central", "longitudinal", "transverse", "upper", "lower", "front", "rear", "left", "right", "vertical", "horizontal", "top", "bottom", "inner", "outer", etc., indicate direction or position relationships shown based on the drawings. Those terms are only intended to facilitate the description of the present invention and the simplification of the description. Those terms do not indicate or imply that the indicated device or element must have a specific direction or constructed and operated in a specific direction. Therefore, those terms shall not be understood as a limitation to the present invention. In addition, those terms such as "first" and "second" are only used for the purpose of description, rather than being understood to indicate or imply relative importance or hint the number of indicated technical features. Thus, the features limited by "first" and "second" can explicitly or impliedly comprise one or more features. In the description of the present invention, the meaning of "a plurality of" is two or more unless otherwise specified.

Embodiment 1

The present embodiment is described below with reference to FIGS. 1-7. The present invention relates to the technical field of crop harvesting machinery, in particular to an automatic harvesting and collecting device for sisal hemp leaves, comprising a forward-and-backward moving assembly 1-1, an up-and-down moving assembly 8-1, a steering device 9-1, a shearing and clamping device 1-3, a shearing and clamping control rod 1-7, a braking mechanism 10-1, a mechanical vision sensor device 1-2, a vehicle traveling and controlling device 11-1, an omnidirectional automatic positioning and rotating device 13-1, a collecting device 14-1, a master control box 2-2, an image processing system 2-21, a storage battery 2-4 and a frame 15-1. The cutting and the collecting of the sisal hemp leaves can be integrated automatically or manually by the present invention.

Figure 1:
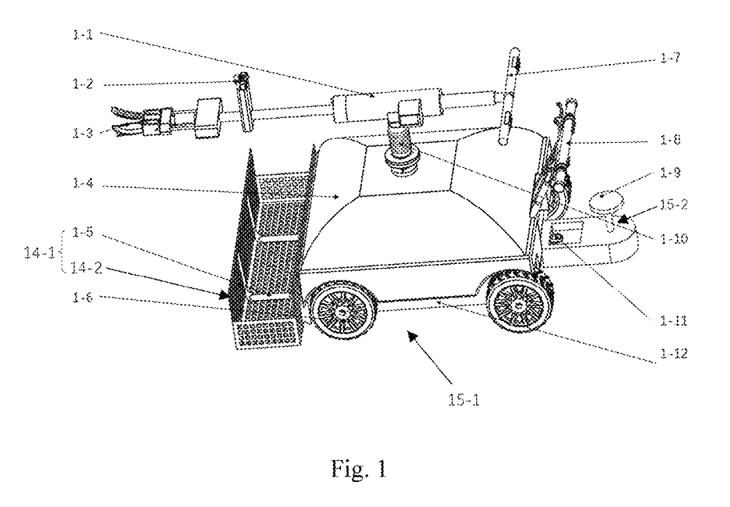
FIG. 1 is a stereoscopic schematic diagram of a structure of an automatic harvesting and collecting device for sisal hemp leaves according to the present invention.
Figure 2:
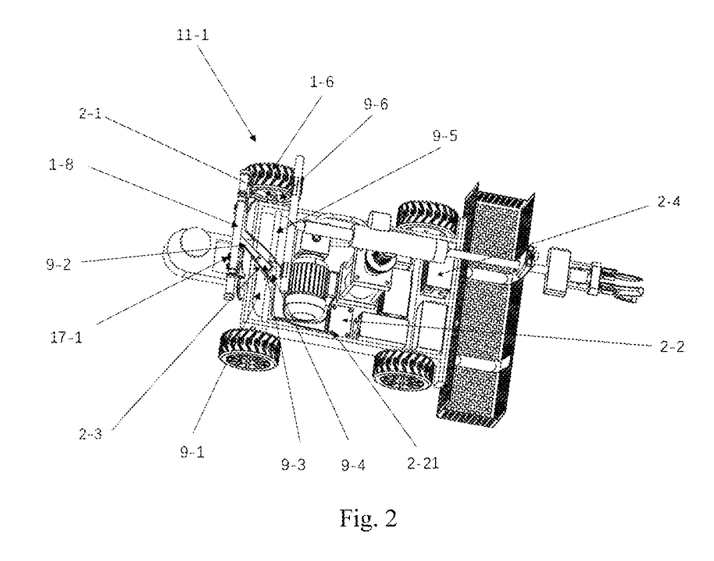
FIG. 2 is a stereoscopic schematic diagram of an internal structure of the automatic harvesting and collecting device for sisal hemp leaves according to the present invention.

The forward-and-backward moving assembly 1-1, the up-and-down moving assembly 8-1, the steering device 9-1, the shearing and clamping device 1-3, the braking mechanism 10-1, the mechanical vision sensor device 1-2, the vehicle traveling and controlling device 11-1, the omnidirectional automatic positioning and rotating device 13-1, the shearing and clamping device 1-3, the shearing and clamping control rod 1-7, the collecting device 14-1, the master control box 2-2 and the storage battery 2-4 are all mounted on the frame 15-1.

The omnidirectional automatic positioning and rotating device 13-1 is mounted on the up-and-down moving assembly 8-1; the up-and-down moving assembly 8-1 is configured to control the up-and-down movement of the omnidirectional automatic positioning and rotating device 13-1; the forward-and-backward moving assembly 1-1 is mounted on the omnidirectional automatic positioning and rotating device 13-1; the shearing and clamping device 1-3 is mounted on the forward-and-backward moving assembly 1-1 used for driving the shearing and clamping device 1-3 to move forward and backward; the omnidirectional automatic positioning and rotating device 13-1 is used for driving the omnidirectional rotation of the forward-and-backward moving assembly 1-1, so as to drive the omnidirectional rotation of the shearing and clamping device 1-3; the shearing and clamping device 1-3 is configured to clamp and shear the sisal hemp leaves; the vehicle traveling and controlling device 11-1 is configured to control the frame 15-1 to move forward and backward; the steering device 9-1 is configured to control the steering of the frame 15-1; the braking mechanism 10-1 is arranged on the steering device 9-1 and is configured to brake the frame 15-1; some parts of the braking mechanism 10-1 are arranged on the steering device 9-1; the mechanical vision sensor device 1-2 is mounted on the forward-and-backward moving assembly 1-1; the image processing system 2-21 is mounted in the master control box 2-2; the mechanical vision sensor device 1-2 is configured to acquire image signals of positions of the sisal hemp leaves and transmit the signals to the image processing system 2-21, thereby obtaining the position information of the sisal hemp leaves; according to the position information of the sisal hemp leaves obtained by the image processing system 2-21, the master control box 2-2 can control the forward-and-backward moving assembly 1-1, the up-and-down moving assembly 8-1 and the omnidirectional automatic positioning and rotating device 13-1 to adjust the orientation and angle of the shearing and clamping device 1-3, then control the shearing and clamping device 1-3 to harvest and collect the sisal hemp leaves automatically.

The shearing and clamping control rod 1-7 is mounted at one end of the forward-and-backward moving assembly 1-1 far away from the shearing and clamping device 1-3, and is configured to manually control and adjust the forward-and-backward moving assembly 1-1, the up-and-down moving assembly 8-1 and the omnidirectional automatic positioning and rotating device 13-1, thereby controlling the shearing and clamping device 1-3 to manually harvest and collect the sisal hemp leaves.

The storage battery 2-4 is connected with the master control box 2-2, and is configured to provide energy for the forward-and-backward moving assembly 1-1, the up-and-down moving assembly 8-1, the mechanical vision sensor device 1-2, the vehicle traveling and controlling device 11-1, the omnidirectional automatic positioning and rotating device 13-1, the shearing and clamping device 1-3 and the master control box 2-2; and the collecting device 14-1 is configured to collect and bundle the sisal hemp leaves.

The automatic harvesting and collecting device for sisal hemp leaves moves to the sisal hemp leaves, and identifies position information of the sisal hemp leaves by the mechanical vision sensor device 1-2; and the shearing and clamping device 1-3 is moved to the sisal hemp leaves by the omnidirectional automatic positioning and rotating device 13-1 and then clamps and shears the sisal hemp leaves.

Embodiment 2

Figure 5:
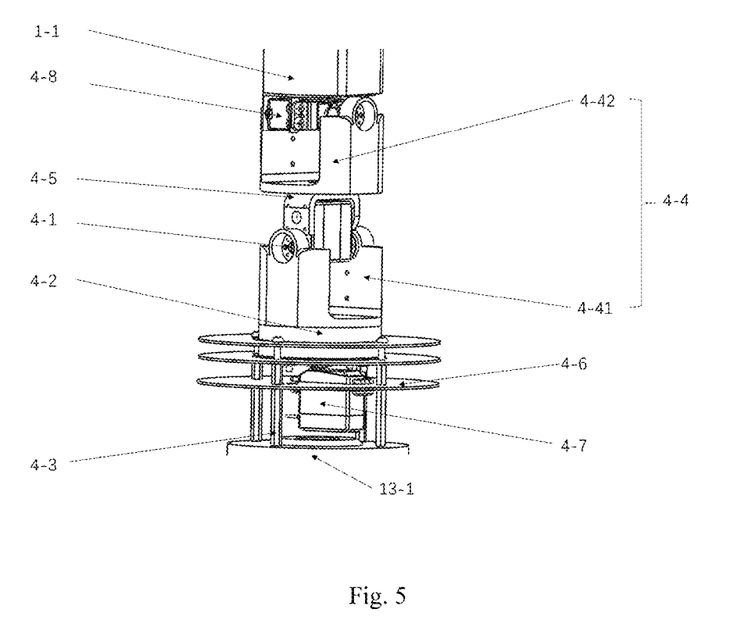
FIG. 5 is a stereoscopic schematic diagram of the structure of an omnidirectional automatic positioning and rotating device according to the present invention.
Figure 7:
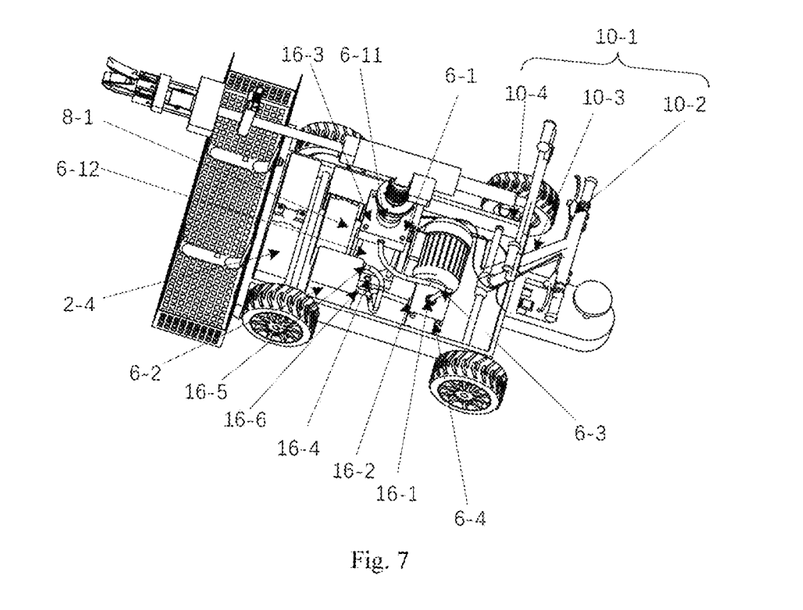
FIG. 7 is a stereoscopic schematic diagram of the structure of an up-and-down moving assembly according to the present invention.

The present embodiment is described below with reference to FIG. 1, FIG. 5 and FIG. 7. The up-and-down moving assembly 8-1 comprises a height adjusting hydraulic cylinder 6-1, an oil tank 6-2, a hydraulic pipeline 6-3 and an electric hydraulic pump 6-4 which are all mounted on the frame 15-1; the storage battery 2-4 is connected with the electric hydraulic pump 6-4 and provides energy for the electric hydraulic pump 6-4; the height adjusting hydraulic cylinder 6-1 comprises a push rod 6-11 and a cylinder block 6-12; one end of the push rod 6-11 extends into the cylinder block 6-12; the other end of the push rod 6-11 is connected with the omnidirectional automatic positioning and rotating device 13-1; the cylinder block 6-12 is configured to store the hydraulic oil needed for operation; the push rod 6-11 can move up and down relative to the cylinder block 6-12; the oil tank 6-2 is configured to supply the hydraulic oil needed for operation to the electric hydraulic pump 6-4 and cylinder block 6-12 through the hydraulic pipeline 6-3; the electric hydraulic pump 6-4 is configured to control the flow direction and the flow rate of hydraulic oil in the hydraulic pipeline 6-3, so as to control the moving direction and speed of the push rod 6-11 of the height adjusting hydraulic cylinder 6-1, thereby controlling the omnidirectional automatic positioning and rotating device 13-1 to move up and down; the electric hydraulic pump 6-4 is provided with a first oil outlet 16-1 and a second oil outlet 16-2; the height adjusting hydraulic cylinder 6-1 is provided with a third oil outlet 16-3 and a fourth oil outlet 16-4; the oil tank 6-2 is provided with a fifth oil outlet 16-5 and a sixth oil outlet 16-6; the first oil outlet 16-1 of the electric hydraulic pump 6-4 is communicated with the third oil outlet 16-3 of the height adjusting hydraulic cylinder 6-1 through the hydraulic pipeline 6-3; the fourth oil outlet 16-4 of the height adjusting hydraulic cylinder 6-1 is communicated with the fifth oil outlet 16-5 of the oil tank 6-2 through the hydraulic pipeline 6-3; the sixth oil outlet 16-6 of the oil tank 6-2 is communicated with the second oil outlet 16-2 of the electric hydraulic pump 6-4 through the hydraulic pipeline 6-3; under the control of the electric hydraulic pump 6-4, the hydraulic oil in the oil tank 6-2 flows out from the sixth oil outlet 16-6, flows into the electric hydraulic pump 6-4 from the second oil outlet 16-2 through the hydraulic pipeline 6-3, then flows out from the first oil outlet 16-1, flows into the cylinder block 6-12 of the height adjusting hydraulic cylinder 6-1 from the third oil outlet 16-3 through the hydraulic pipeline 6-3, then flows out from the fourth oil outlet 16-4, and flows into the oil tank 6-2 from the fifth oil outlet 16-5 through the hydraulic pipeline 6-3, so as to form a hydraulic system loop. The hydraulic system provides a certain amount of hydraulic energy, so that the up-and-down moving assembly 8-1 drives the omnidirectional automatic positioning and rotating device 13-1 to move up and down.

Embodiment 3

The present embodiment is described below with reference to FIG. 2. The steering device 9-1 comprises wheels 1-6, a direction steering control rod 1-8, a steering rod 9-2, a steering shaft 9-3, a straightening rod 9-4, a steering tie rod 9-5 and a steering knuckle 9-6 which are all mounted on the frame 15-1; the direction steering control rod 1-8 is in transmission connection with the steering rod 9-2; the steering rod 9-2 is nested in the steering shaft 9-3 and is in transmission connection with the steering shaft 9-3; the steering shaft 9-3 is nested in the straightening rod 9-4 and is in transmission connection with the straightening rod 9-4; the straightening rod 9-4 is in transmission connection with the steering tie rod 9-5; the steering tie rod 9-5 is in transmission connection with the steering knuckle 9-6; the steering knuckle 9-6 is in transmission connection with the wheels 1-6; the direction steering control rod 1-8 is rotated to drive the steering rod 9-2 to rotate, thereby driving the steering shaft 9-3 to rotate; the rotation of the steering shaft 9-3 drives the straightening rod 9-4 to rotate to drive the steering tie rod 9-5 to move, thereby driving the wheels 1-6 to steer through the steering knuckle 9-6 and realizing the steering of the frame 15-1; and the steering rod 9-2 can move up and down along the own axis, thereby driving the direction steering control rod 1-8 to move up and down.

Embodiment 4

Figure 3:
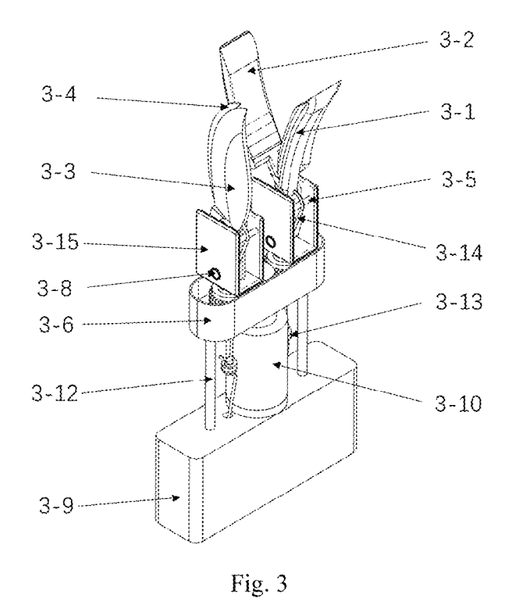
FIG. 3 is a stereoscopic schematic diagram of the structure of a shearing and clamping device according to the present invention.
Figure 4:
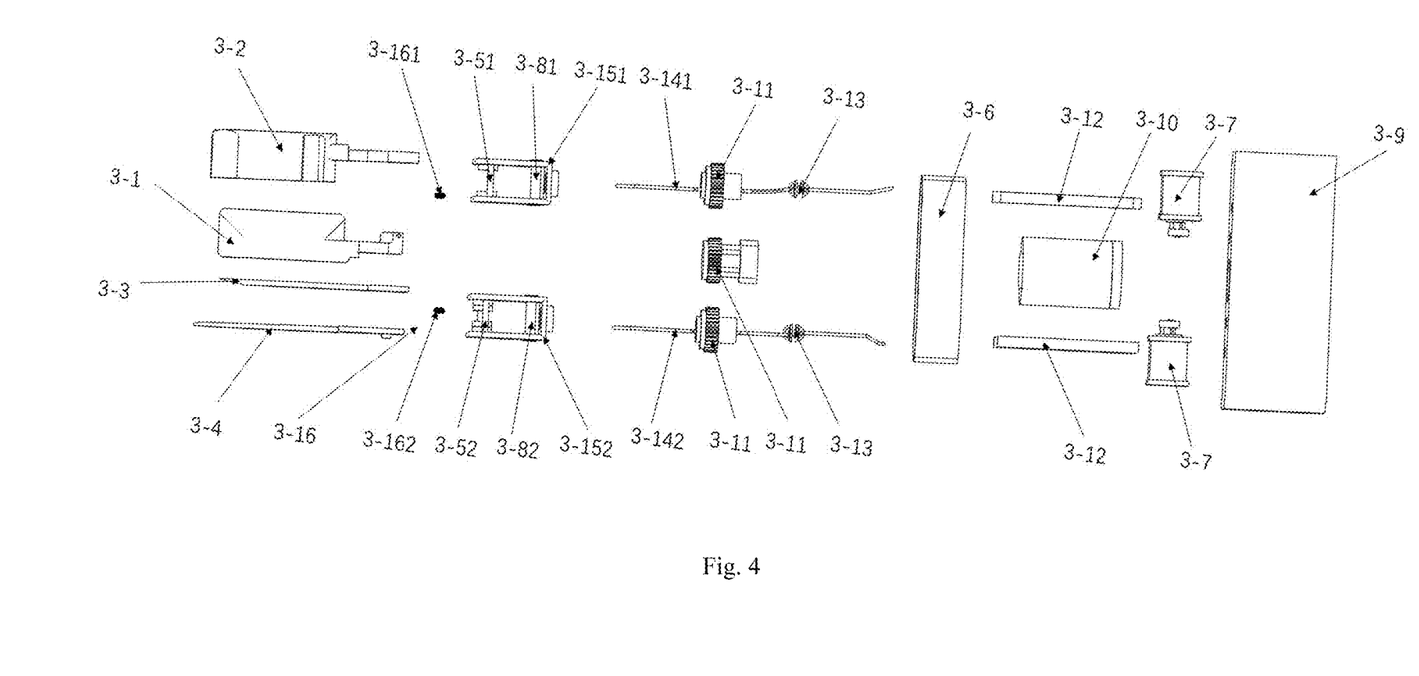
FIG. 4 is an exploded diagram of the shearing and clamping device according to the present invention.

The present embodiment is described below with reference to FIG. 1, FIG. 3 and FIG. 4. The shearing and clamping device 1-3 comprises an upper clamping piece 3-1, a lower clamping piece 3-2, an upper blade 3-3, a lower blade 3-4, two pulling rope pin shafts 3-5, a turntable gear box 3-6, first stepping motors 3-7, two fixing bolts 3-8, a rope winding double-motor box 3-9, a first spindle motor 3-10, a first gear 3-11, loose rotating rods 3-12, encircling small rings 3-13, two pulling ropes 3-14, two clamping blade fixing heads 3-15 and two springs 3-16.

The two fixing bolts 3-8 refer to a first fixing bolt 3-81 and a second fixing bolt 3-82, respectively; and the two clamping blade fixing heads 3-15 refer to a first clamping blade fixing head 3-151 and a second clamping blade fixing head 3-152, respectively.

The first fixing bolt 3-81 sequentially penetrates through the first clamping blade fixing head 3-151, the upper clamping piece 3-1 and the lower clamping piece 3-2; the upper clamping piece 3-1 is in clearance fit with the first fixing bolt 3-81; both the lower clamping piece 3-2 and the first clamping blade fixing head 3-15 are in interference fit with the first fixing bolt 3-81, so that the upper clamping piece 3-1 can rotate about the first fixing bolt 3-81.

The second fixing bolt 3-82 sequentially penetrates through the second clamping blade fixing head 3-152, the upper blade 3-3 and the lower blade 3-4; the upper blade 3-3 is in clearance fit with the second fixing bolt 3-82; both the lower blade 3-4 and the second clamping blade fixing head 3-152 are in interference fit with the second fixing bolt 3-82, so that the upper blade 3-3 can rotate about the second fixing bolt 3-82.

The two springs 3-16 respectively refer to a first spring 3-161 and a second spring 3-162; the first spring 3-161 is arranged between the upper clamping piece 3-1 and the lower clamping piece 3-2, and provides opposite elastic forces for the upper clamping piece 3-1 and the lower clamping piece 3-2 respectively, so that the upper clamping piece 3-1 and the lower clamping piece 3-2 are in a closed state; the second spring 3-162 is arranged between the upper blade 3-3 and the lower blade 3-4, and provides opposite elastic forces for the upper blade 3-3 and the lower blade 3-4 respectively, so that the upper blade 3-3 and the lower blade 3-4 are in a closed state.

The first clamping blade fixing head 3-151 and the second clamping blade fixing head 3-152 are connected with two first gears 3-11 mounted in a turntable gearbox 3-6, respectively; another first gear 3-11 is mounted between the two first gears 3-11; the first gears on both sides are meshed with the middle first gear, respectively; the turntable gearbox 3-6 is connected with one end of the first spindle motor 3-10; the upper blade 3-3 and the upper clamping piece 3-1 are connected with one end of the two pulling ropes 3-14; the other end of the first spindle motor 3-10 is connected with the rope winding double-motor box 3-9; the first spindle motor 3-10 drives the three first gears 3-11 in the turntable gearbox 3-6 to rotate, so as to drive the first clamping blade fixing head 3-151 and the second clamping blade fixing head 3-152 to rotate respectively, thereby changing the relative positions of the upper clamping piece 3-1 and the lower clamping piece 3-2, the upper blade 3-3 and the lower blade 3-4, so that the upper clamping piece 3-1 and the lower clamping piece 3-2, the upper blade 3-3 and the lower blade 3-4 can clamp and shear the sisal hemp leaves in different directions.

The first stepping motor 3-7 is arranged in the rope winding double-motor box 3-9; and the rope winding double-motor box 3-9 is mounted on the forward-and-backward moving assembly 1-1.

The two pulling ropes 3-14 refer to a first pulling rope 3-141 and a second pulling rope 3-142, respectively; two pulling rope pin shafts 3-5 refer to a first pulling rope pin shaft 3-51 and a second pulling rope pin shaft 3-52, respectively; the upper blade 3-3 is connected with one end of the second pulling rope 3-142; the other end of the second pulling rope 3-142 bypasses the second pulling rope pin shaft 3-52 and extends outwards to be connected with the first stepping motor 3-7; the upper clamping piece 3-1 is connected with one end of the first pulling rope 3-141; the other end of the first pulling rope 3-141 bypasses the first pulling rope pin shaft 3-51 and extends outwards to be connected with the first stepping motor 3-7; both the first pulling rope 3-141 and the second pulling rope 3-142 are positioned through the turntable gearbox 3-6; and the first stepping motor 3-7 can control the upper clamping piece 3-1 and the upper blade 3-3 to clamp and shear the sisal hemp leaves through the first pulling rope 3-141 and the second pulling rope 3-142, so that the shearing and clamping device shears the sisal hemp leaves. The encircling small rings 3-13 are connected to the pulling ropes 3-14, and achieve the effect of unloading the torque generated by the rotation of the pulling ropes 3-14, thereby avoiding the breaking of the pulling ropes 3-14. The rope winding double-motor box 3-9 is connected with the turntable gearbox 3-6 through the loose rotating rod 3-12; the loose rotating rod 3-12 is provided to avoid the intertwining of two pulling ropes 3-14 during rotation of the rope winding double-motor box 3-9 and the turntable gearbox 3-6. When the frame 15-1 moves aside the sisal hemp leaves, the positions of the sisal hemp leaves are judged. If the sisal hemp leaves, the upper clamping piece 3-1, the lower clamping piece 3-2, the upper blade 3-3 and the lower blade 3-4 are located at preset positions respectively, the shearing and clamping device directly clamps the sisal hemp leaves, and then shears the sisal hemp leaves. If the sisal hemp leaves, the upper clamping piece 3-1, the lower clamping piece 3-2, the upper blade 3-3 and the lower blade 3-4 are respectively located at positions opposite to preset positions, the first spindle motor 3-10 drives the first clamping blade fixing head 3-151 and the second clamping blade fixing head 3-152 to rotate by 180°; and then the sisal hemp leaves are clamped and sheared by controlling the upper clamping piece 3-1 and the upper blade 3-3 via a first stepping motor 3-7.

Embodiment 5

The present embodiment is described below with reference to FIG. 7. The braking mechanism 10-1 comprises a brake lever 10-2, a steel wire 10-3 and a brake pad 10-4; the brake lever 10-2 is connected with the steel wire 10-3; the steel wire 10-3 is connected with the brake pad 10-4; the brake pad 10-4 is used for compressing the wheel 1-6; the brake lever 10-2 is connected with the steel wire 10-3; one end of the steel wire 10-3 far away from the brake lever 10-2 is connected with the brake pad 10-4; the steel wire 10-3 is stretched by gripping the brake lever 10-2, to pull the brake pad 10-4, so that the brake pad 10-4 compresses the wheel 1-6 to stop the rotation of the wheel 1-6.

Embodiment 6

Figure 6:
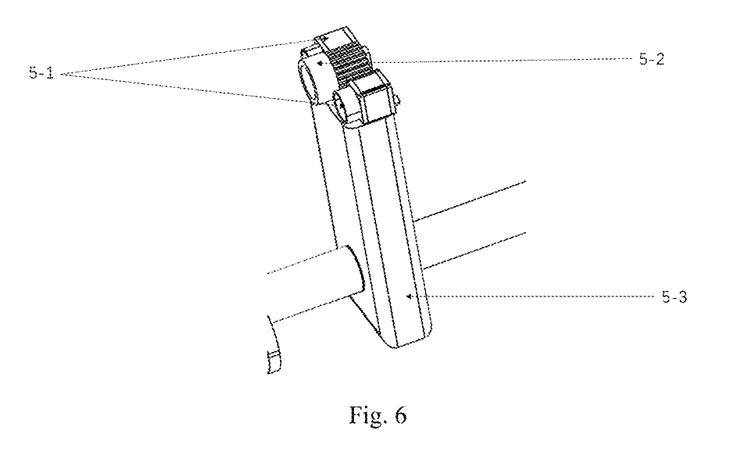
FIG. 6 is a stereoscopic schematic diagram of the structure of a mechanical vision sensor device according to the present invention.

The present embodiment is described below with reference to FIG. 1, FIG. 2 and FIG. 6. The mechanical vision sensor device 1-2 comprises a mechanical vision sensor 5-1, an illuminating lamp 5-2 and a base bracket 5-3; the base bracket 5-3 is mounted on the forward-and-backward moving assembly 1-1; the mechanical vision sensor 5-1 and the illuminating lamp 5-2 are arranged on the base bracket 5-3; the mechanical vision sensor 5-1 is connected with the image processing system 2-21 mounted in the master control box 2-2; the mechanical vision sensor 5-1 is configured to acquire image signals of positions of the sisal hemp leaves and transmit the image signals to the image processing system 2-21, thereby obtaining the position information of the sisal hemp leaves; according to the position information of the sisal hemp leaves obtained by the image processing system 2-21, the master control box 2-2 can control the forward-and-backward moving assembly 1-1, the up-and-down moving assembly 8-1 and the omnidirectional automatic positioning rotating device 13-1 to adjust the orientation and angle of the shearing and clamping device 1-3, then the sisal hemp leaves are automatically harvested and collected. The image processing system 2-21 performs various operations on image signals acquired by the mechanical vision sensors 5-1 to extract the position features of the sisal hemp leaves; and then the shearing and clamping device 1-3 is moved by the master control box 2-2; and finally, the shearing and clamping device 1-3 shears and clamps the sisal hemp leaves.

Embodiment 7

The present embodiment is described below with reference to FIG. 2. The vehicle traveling and controlling device 11-1 comprises a hub motor 2-1; the hub motor 2-1 is mounted on the frame 15-1 and connected with the direction steering control rod 1-8, and can drive the frame 15-1 to move forward and backward; the direction steering control rod 1-8 is provided with a button 17-1 for controlling the rotating direction of the hub motor 2-1; the button 17-1 is connected with the hub motor 2-1 and adjusted to control the rotating direction of the hub motor 2-1, so as to control the frame 15-1 to move forward and backward; and the storage battery 2-4 is connected with the hub motor 2-1 and is configured to provide energy for the hub motor 2-1.

Embodiment 8

Figure 8:
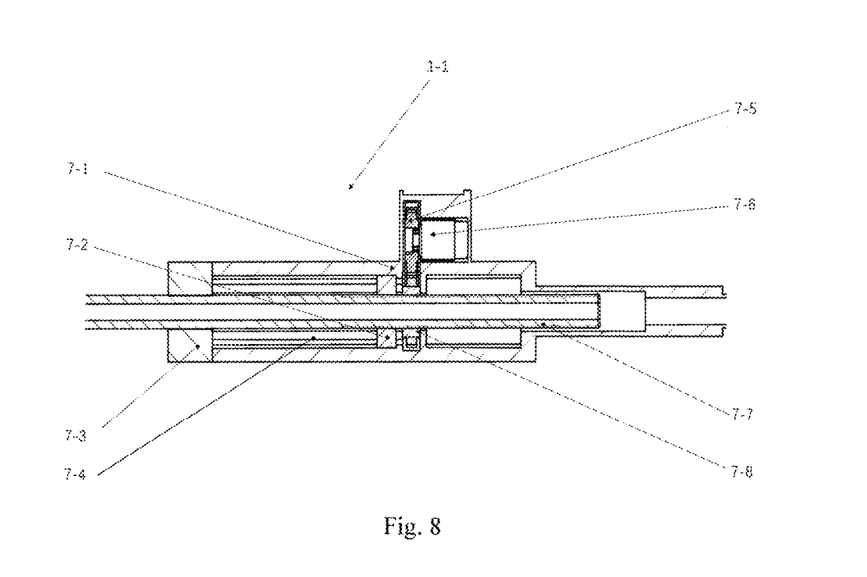
FIG. 8 is a stereoscopic schematic diagram of the structure of a forward-and-backward moving assembly according to the present invention.

The present embodiment is described below with reference to FIG. 1 and FIG. 8. The forward-and-backward moving assembly 1-1 comprises a telescopic rod shell 7-1, an anti-rotation piece 7-2, a telescopic rod upper cover 7-3, a fixed rod 7-4, a second gear 7-5, a third stepping motor 7-6, a lead screw 7-7 and a gear nut 7-8. The telescopic rod shell 7-1 is mounted on the omnidirectional automatic positioning and rotating device 13-1; the lead screw 7-7 is penetrated in the telescopic rod shell 7-1; the gear nut 7-8 is sleeved on the lead screw 7-7; the gear nut 7-8 is in threaded fit with the lead screw 7-7; the third stepping motor 7-6 is arranged on the telescopic rod shell 7-1 and connected with the second gear 7-5; and the second gear 7-5 is meshed with the gear nut 7-8 sleeved on the lead screw 7-7. The fixed rod 7-4 is arranged in the telescopic rod shell 7-1, and abuts against the gear nut 7-8 to prevent the gear nut 7-8 from following the lead screw 7-7 to move along an axial direction of the lead screw 7-7 during rotation of the gear nut 7-8; the anti-rotation piece 7-2 is fixedly connected with the lead screw 7-7, is connected with the fixed rod 7-4 in a clamping manner, and is configured to limit the rotation of the lead screw 7-7, so that the lead screw 7-7 can move along the axial direction of the lead screw; the telescopic rod upper cover 7-3 is arranged at the front end of the telescopic rod shell 7-1, and is configured to seal the telescopic rod shell 7-1; the second gear 7-5 rotates under the rotation of the third stepping motor 7-6, to drive the gear nut 7-8 to rotate, so that the lead screw 7-7 moves forward and backward along the axial direction of the lead screw, thereby driving the shearing and clamping device 1-3 to move forward and backward.

Embodiment 9

The present embodiment is described below with reference to FIG. 1 and FIG. 5. The omnidirectional automatic positioning and rotating device 13-1 comprises a second stepping motor 4-1, a rotatable chassis 4-2, a support rod 4-3, two cylindrical brackets 4-4, an L-shaped bracket 4-5, a fixed disc 4-6, a second spindle motor 4-7 and a fourth stepping motor 4-8; the fixed disc 4-6 is fixed on the height adjusting hydraulic cylinder 6-1 by the support rod 4-3; the rotatable chassis 4-2 is in clearance fit with the second spindle motor 4-7, and can be driven to perform omnidirectional rotation by the second spindle motor 4-7.

The two cylindrical brackets 4-4 refer to a first cylindrical bracket 4-41 and a second cylindrical bracket 4-42, respectively; the first cylindrical bracket 4-41 is fixedly mounted on the fixed disc 4-6; an upper end of the first cylindrical bracket 4-41 is in clearance fit with the second stepping motor 4-1; the L-shaped bracket 4-5 is arranged on the second stepping motor 4-1, and is fixedly connected with the second cylindrical bracket 4-42 in a vertical direction; the fourth stepping motor 4-8 is mounted on the second cylindrical bracket 4-42 and is connected with the forward-and-backward moving assembly 1-1; the second spindle motor 4-7 is configured to drive the rotatable chassis 4-2 to rotate, thereby driving the first cylindrical bracket 4-41 to rotate; the second stepping motor 4-1 is configured to drive the L-shaped bracket 4-5 to rotate, thereby driving the second cylindrical bracket 4-42 to rotate; the fourth stepping motor 4-8 is configured to drive the forward-and-backward moving assembly 1-1 to rotate, so as to adjust the orientation and angle of the shearing and clamping device 1-3; a dust boot 1-10 is sleeved outside the fixed disc 4-6; and the dust boot 1-10 achieves the effect of dust prevention.

Embodiment 10

The present embodiment is described below with reference to FIG. 1-FIG. 7. The collecting device 14-1 comprises a collecting box 14-2 and a bundling belt 1-5; the collecting box 14-2 is mounted on the frame 15-1 and is configured to collect the sisal hemp leaves; the bundling belt 1-5 is mounted in the collecting box 14-2 and is configured to bundle the sisal hemp leaves collected by the collecting box 14-2; the frame 15-1 comprises a chassis 1-12, a support platform 15-2, an upper hood 1-4 and a rear seat 1-9; the chassis 1-12 is connected with the wheels 1-6; the support platform 15-2 is mounted on the chassis 1-12 and is configured to accommodate the forward-and-backward moving assembly 1-1, the up-and-down moving assembly 8-1, the steering device 9-1, the shearing and clamping device 1-3, the braking mechanism 10-1, the mechanical vision sensor device 1-2, the vehicle traveling and controlling device 11-1, the omnidirectional automatic positioning and rotating device 13-1, the shearing and clamping device 1-3 and the collecting device 14-1; the upper hood 1-4 is arranged on the support platform 15-2; the up-and-down moving assembly 8 is penetrated in the upper hood 1-4 to control the omnidirectional automatic positioning and rotating device 13-1 to move up and down; and the rear seat 1-9 is arranged on the support platform 15-2.

Certainly, the above description does not limit the present invention; and the present invention is not limited to the above examples. Changes, modifications, additions or substitutions made by those ordinary skilled in the art within the substantial scope of the present invention also fall within the protection scope of the present invention.

What is claimed is:

1. An automatic harvesting and collecting device for sisal hemp leaves comprising
   a forward-and-backward moving assembly;
   an up-and-down moving assembly;
   a steering device;
   a braking mechanism;
   a mechanical vision sensor device;
   a vehicle traveling and controlling device;
   an omnidirectional automatic positioning and rotating device;
   a shearing and clamping device;
   a shearing and clamping control rod;
   a collecting device;
   a master control box;
   an image processing system;
   a storage battery; and
   a frame;
   wherein the forward-and-backward moving assembly, the up-and-down moving assembly, the steering device, the shearing and clamping device, the braking mechanism, the mechanical vision sensor device, the vehicle traveling and controlling device, the omnidirectional automatic positioning and rotating device, the shearing and clamping device, the shearing and clamping control rod, the collecting device, the master control box and the storage battery are all mounted on the frame;
   the omnidirectional automatic positioning and rotating device is mounted on the up-and-down moving assembly configured to control an up-and-down movement of the omnidirectional automatic positioning and rotating device; the forward-and-backward moving assembly is mounted on the omnidirectional automatic positioning and rotating device; the shearing and clamping device is mounted on the forward-and-backward moving assembly configured to drive the shearing and clamping device to move forward and backward; the omnidirectional automatic positioning and rotating device is configured to drive an omnidirectional rotation of the forward-and-backward moving assembly, thereby driving an omnidirectional rotation of the shearing and clamping device; and the shearing and clamping device is configured to clamp and shear the sisal hemp leaves;
   the vehicle traveling and controlling device is configured to control the frame to move forward and backward; the steering device is configured to steer the frame; the braking mechanism is arranged on the steering device and is configured to brake the frame; the mechanical vision sensor device is mounted on the forward-and-backward moving assembly; and the image processing system is mounted in the master control box; the mechanical vision sensor device is configured to acquire image signals of positions of the sisal hemp leaves and transmit the image signals to the image processing system, thereby obtaining position information of the sisal hemp leaves;
   the master control box is operable to, according to the position information of the sisal hemp leaves, control the forward-and-backward moving assembly, the up-and-down moving assembly, and the omnidirectional automatic positioning and rotating device to adjust an orientation and an angle of the shearing and clamping device, then control the shearing and clamping device to harvest and collect the sisal hemp leaves automatically;
   the shearing and clamping control rod is mounted at an end of the forward-and-backward moving assembly opposite to the shearing and clamping device, and is configured to manually control and adjust the forward-and-backward moving assembly, the up-and-down moving assembly, and the omnidirectional automatic positioning and rotating device so as to control the shearing and clamping device to manually harvest and collect the sisal hemp leaves;
   the storage battery is connected to the master control box, and is configured to provide energy for the forward-and-backward moving assembly, the up-and-down moving assembly, the mechanical vision sensor device, the vehicle traveling and controlling device, the omnidirectional automatic positioning and rotating device, the shearing and clamping device and the master control box;
   the up-and-down moving assembly comprises a height adjusting hydraulic cylinder, an oil tank, a hydraulic pipeline and an electric hydraulic pump which are all mounted on the frame;
   the storage battery is connected with the electric hydraulic pump and provides energy for the electric hydraulic pump; the height adjusting hydraulic cylinder comprises a push rod and a cylinder block; one end of the push rod extends into the cylinder block; the other end of the push rod is connected with the omnidirectional automatic positioning and rotating device; the cylinder block is configured to store hydraulic oil needed for operation; the push rod is movable up and down relative to the cylinder block; the oil tank is configured to supply the hydraulic oil to the electric hydraulic pump and the cylinder block through the hydraulic pipeline; and the electric hydraulic pump is configured to control a flow direction and a flow rate of the hydraulic oil in the hydraulic pipeline, so as to control a moving direction and a moving speed of the push rod of the height adjusting hydraulic cylinder, thereby controlling the omnidirectional automatic positioning and rotating device to move up and down;
   the electric hydraulic pump is provided with a first oil outlet and a second oil outlet; the height adjusting hydraulic cylinder is provided with a third oil outlet and a fourth oil outlet; the oil tank is provided with a fifth oil outlet and a sixth oil outlet; the first oil outlet of the electric hydraulic pump is communicated with the third oil outlet of the height adjusting hydraulic cylinder through the hydraulic pipeline the fourth oil outlet of the height adjusting hydraulic cylinder is communicated with the fifth oil outlet of the oil tank through the hydraulic pipeline; and the sixth oil outlet of the oil tank is communicated with the second oil outlet of the electric hydraulic pump through the hydraulic pipeline; and under the control of the electric hydraulic pump, the hydraulic oil in the oil tank flows out from the sixth oil outlet, flows into the electric hydraulic pump from the second oil outlet through the hydraulic pipeline then flows out from the first oil outlet, flows into the cylinder block of the height adjusting hydraulic cylinder from the third oil outlet through the hydraulic pipeline, then flows out from the fourth oil outlet, and flows into the oil tank from the fifth oil outlet through the hydraulic pipeline so as to form a hydraulic system loop.

2. The automatic harvesting and collecting device for sisal hemp leaves according to claim 1, wherein the steering device comprises wheels, a direction steering control rod, a steering rod, a steering shaft, a straightening rod, a steering tie rod, and a steering knuckle which are all mounted on the frame;

the direction steering control rod is in transmission connection with the steering rod; the steering rod is nested in the steering shaft and in transmission connection with the steering shaft; the steering shaft is nested in the straightening rod and in transmission connection with the straightening rod; the straightening rod is in transmission connection with the steering tie rod; the steering tie rod is in transmission connection with the steering knuckle; and the steering knuckle is in transmission connection with the wheels; and the direction steering control rod is rotated to drive the steering rod to rotate, thereby driving the steering shaft to rotate; a rotation of the steering shaft drives the straightening rod to rotate to drive the steering tie rod to move, thereby driving the wheels to steer through the steering knuckle and steering the frame; and the steering rod moves up and down along own axis, thereby driving the direction steering control rod to move up and down.

3. The automatic harvesting and collecting device for sisal hemp leaves according to claim 2, wherein the shearing and clamping device comprises an upper clamping piece, a lower clamping piece, an upper blade, a lower blade, two pulling rope pin shafts, a turntable gear box, two stepping motors, two fixing bolts, a rope winding double-motor box, a first spindle motor, a first gear, two loose rotating rods, two encircling small rings, two pulling ropes, two clamping blade fixing heads, and two springs;

the two fixing bolts refer to a first fixing bolt and a second fixing bolt, respectively; and the two clamping blade fixing heads refer to a first clamping blade fixing head and a second clamping blade fixing head, respectively;

the first fixing bolt sequentially penetrates through the first clamping blade fixing head, the upper clamping piece and the lower clamping piece; the upper clamping piece is in clearance fit with the first fixing bolt; both the lower clamping piece and the first clamping blade fixing head are in interference fit with the first fixing bolt, so that the upper clamping piece is rotatable about the first fixing bolt;

the second fixing bolt sequentially penetrates through the second clamping blade fixing head, the upper blade and the lower bladed; the upper blade is in clearance fit with the second fixing bolt; both the lower blade and the second clamping blade fixing head are in interference fit with the second fixing bolt, so that the upper blade is rotatable about the second fixing bolt;

the two springs respectively refer to a first spring and a second spring; the first spring is arranged between the upper clamping piece and the lower clamping piece, and provides opposite elastic forces for the upper clamping piece and the lower clamping piece respectively, so that the upper clamping piece and the lower clamping piece are in a closed state; the second spring is arranged between the upper blade and the lower blade, and provides opposite elastic forces for the upper blade and the lower blade respectively, so that the upper blade and the lower blade are in a closed state;

the first clamping blade fixing head and the second clamping blade fixing head are connected with two first gears mounted in a turntable gearbox, respectively; another first gear is mounted between the two first gears; the first gears on both sides are meshed with the middle first gear, respectively; the turntable gearbox is connected with one end of the first spindle motor; the other end of the first spindle motor is connected with the rope winding double-motor box; the first spindle motor drives the three first gears in the turntable gearbox to rotate so as to drive the first clamping blade fixing head and the second clamping blade fixing head to rotate respectively, thereby changing relative positions of the upper clamping piece and the lower clamping piece, the upper blade, and the lower blade, so that the upper clamping piece and the lower clamping piece, the upper blade and the lower blade clamp and shear the sisal hemp leaves in different directions;

the first stepping motor is arranged in the rope winding double-motor box; and the rope winding double-motor box is mounted on the forward-and-backward moving assembly;

the two pulling ropes refer to a first pulling rope and a second pulling rope, respectively; two pulling rope pin shafts refer to a first pulling rope pin shaft and a second pulling rope pin shaft, respectively; the upper blade is connected with one end of the second pulling rope; the other end of the second pulling rope bypasses the second pulling rope pin shaft and extends outwards to be connected with the first stepping motor; the upper clamping piece is connected with one end of the first pulling rope; the other end of the first pulling rope bypasses the first pulling rope pin shaft, and extends outwards to be connected with the first stepping motor; both the first pulling rope and the second pulling rope are positioned through the turntable gearbox; and the first stepping motor can control the upper clamping piece and the upper blade to clamp and shear the sisal hemp leaves through the first pulling rope and the second pulling rope, respectively; and the rope winding double-motor box is connected with the turntable gearbox through the loose rotating rod; and the winding small ring for preventing a rotation of the pulling rope is wound around the pulling rope.

4. The automatic harvesting and collecting device for sisal hemp leaves according to claim 3, wherein the braking mechanism comprises a brake lever, a steel wire and a brake pad; and the brake pad is used for compressing is configured to compress the wheel; the brake lever is connected with one end of the steel wire; the other end of the steel wire far away from the brake lever is connected with the brake pad; the steel wire is stretched by gripping the brake lever, to pull the brake pad, so that the brake pad compresses the wheel to stop a rotation of the wheel.

5. The automatic harvesting and collecting device for sisal hemp leaves according to claim 4, wherein the mechanical vision sensor device comprises a mechanical vision sensor, an illuminating lamp and a base bracket;

the base bracket is mounted on the forward-and-backward moving assembly; the mechanical vision sensor and the illuminating lamp are arranged on the base bracket; the mechanical vision sensor is connected with the image processing system mounted in the master control box; and the mechanical vision sensor is configured to acquire the image signals of positions of the sisal hemp leaves and transmit the image signals to the image processing system, thereby obtaining the position information of the sisal hemp leaves; according to the position information of the sisal hemp leaves obtained by the image processing system, the master control box can is configured to control the forward-and-backward moving assembly, the up-and-down moving assembly and the omnidirectional automatic positioning rotating device to adjust the orientation and the angle of the shearing and clamping device such that the sisal hemp leaves are harvested and collected automatically.

6. The automatic harvesting and collecting device for sisal hemp leaves according to claim 5, wherein the vehicle traveling and controlling device comprises a hub motor, which is mounted on the frame and connected with the direction steering control rod and is configured to drive the frame to move forward and backward; and the direction steering control rod is provided with a button for controlling a rotating direction of the hub motor; the button is connected with the hub motor and adjusted to control the rotating direction of the hub motor so as to control the frame to move forward and backward; and the storage battery is connected with the hub motor and is configured to provide energy for the hub motor.

7. The automatic harvesting and collecting device for sisal hemp leaves according to claim 6, wherein the forward-and-backward moving assembly comprises a telescopic rod shell, an anti-rotation piece, a telescopic rod upper cover, a fixed rod, a second gear, a third stepping motor, a lead screw and a gear nut;

the telescopic rod shell is mounted on the omnidirectional automatic positioning and rotating device; the lead screw is penetrated in the telescopic rod shell; the gear nut is sleeved on the lead screw; the gear nut is in threaded fit with the lead screw; the third stepping motor is arranged on the telescopic rod shell and connected with the second gear; and the second gear is meshed with the gear nut sleeved on the lead screw; and the fixed rod is arranged in the telescopic rod shell, and abuts against the gear nut to prevent the gear nut from following the lead screw to move along an axial direction of the lead screw during a rotation of the gear nut; the anti-rotation piece is fixedly connected with the lead screw, is connected with the fixed rod in a clamping manner, and is configured to limit a rotation of the lead screw, so that the lead screw is movable along the axial direction of the lead screw; the telescopic rod upper cover is arranged at a front end of the telescopic rod shell, and is configured to seal the telescopic rod shell; and the second gear is rotatable under a rotation of the third stepping motor, to drive the gear nut to rotate, so that the lead screw moves forward and backward along the axial direction of the lead screw, thereby driving the shearing and clamping device to move forward and backward.

8. The automatic harvesting and collecting device for sisal hemp leaves according to claim 7, wherein the omnidirectional automatic positioning and rotating device comprises a second stepping motor, a rotatable chassis, a support rod, two cylindrical brackets, an L-shaped bracket, a fixed disc, a second spindle motor and a fourth stepping motor;

the fixed disc is fixed on the height adjusting hydraulic cylinder by the support rod; the rotatable chassis is in clearance fit with the second spindle motor; and the two cylindrical brackets refer to a first cylindrical bracket and a second cylindrical bracket; the first cylindrical bracket is fixedly mounted on the fixed disc; an upper end of the first cylindrical bracket is in clearance fit with the second stepping motor; the L-shaped bracket is arranged on the second stepping motor and fixedly connected with the second cylindrical bracket in a vertical direction; the fourth stepping motor is mounted on the second cylindrical bracket and connected with the forward-and-backward moving assembly; the second spindle motor is configured to drive the rotatable chassis to rotate, thereby driving the first cylindrical bracket to rotate; the second stepping motor is configured to drive the L-shaped bracket to rotate, thereby driving the second cylindrical bracket to rotate; the fourth stepping motor is configured to drive the forward-and-backward moving assembly to rotate, so as to adjust the orientation and angle of the shearing and clamping device; and a dust boot is sleeved outside the fixed disc.

9. The automatic harvesting and collecting device for sisal hemp leaves according to claim 8, wherein the collecting device comprises a collecting box; the collecting box is mounted on the frame and is configured to collect the sisal hemp leaves; the frame comprises a chassis, a support platform, an upper hood and a rear seat;

the chassis is connected with the wheels; the support platform is mounted on the chassis and configured to accommodate the forward-and-backward moving assembly, the up-and-down moving assembly, the steering device, the shearing and clamping device, the braking mechanism, the mechanical vision sensor device, the vehicle traveling and controlling device, the omnidirectional automatic positioning and rotating device, the shearing and clamping device and the collecting device; and the upper hood is arranged on the support platform; the up-and-down moving assembly is penetrated in the upper hood to control the omnidirectional automatic positioning and rotating device to move up and down; and the rear seat is arranged on the support platform.

* * * * *